US011810576B2

(12) United States Patent
Sarikaya

(10) Patent No.: US 11,810,576 B2
(45) Date of Patent: Nov. 7, 2023

(54) PERSONALIZATION OF EXPERIENCES WITH DIGITAL ASSISTANTS IN COMMUNAL SETTINGS THROUGH VOICE AND QUERY PROCESSING

(71) Applicant: Microsoft Technology Licensing, LLC, Redmond, WA (US)

(72) Inventor: Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 17/064,252

(22) Filed: Oct. 6, 2020

(65) Prior Publication Data

US 2021/0020182 A1 Jan. 21, 2021

Related U.S. Application Data

(63) Continuation of application No. 15/253,762, filed on Aug. 31, 2016, now Pat. No. 10,832,684.

(51) Int. Cl.
*G10L 15/18* (2013.01)
*G10L 17/06* (2013.01)
(Continued)

(52) U.S. Cl.
CPC .......... *G10L 17/06* (2013.01); *G10L 15/183* (2013.01); *G10L 15/1815* (2013.01);
(Continued)

(58) Field of Classification Search
None
See application file for complete search history.

(56) References Cited

U.S. PATENT DOCUMENTS 7,620,549 B2 ‡ 11/2009 Di Cristo .............. G06F 40/232
704/25
7,657,433 B1 ‡ 2/2010 Chang .................... G10L 15/08
704/236

(Continued)

FOREIGN PATENT DOCUMENTS

WO          WO A2 ‡  5/2001
 2001-05-10-0133314
WO          WO A1 ‡  3/2015
 2015-03-19-2015039105

OTHER PUBLICATIONS

"Computer Hope: Voice Recognition", Retrieved on: Aug. 5, 2016, http://www.computerhope.com/jargon/v/voicreco.htm, 3 pages.‡

(Continued)

*Primary Examiner* — Richard Z Zhu

(57) ABSTRACT

In non-limiting examples of the present disclosure, systems, methods and devices for providing personalized experiences to a computing device based on user input such as voice, text and gesture input are provided. Acoustic patterns associated with voice input, speech patterns, language patterns and natural language processing may be used to identify a specific user providing input from a plurality of users, identify user background characteristics and traits for the specific user, and topically categorize user input in a tiered hierarchical index. Topically categorized user input may be supplemented with user data and world knowledge and personalized responses and feedback for an identified specific user may be provided reactively and proactively.

19 Claims, 10 Drawing Sheets

(51) Int. Cl.
G10L 25/63 (2013.01)
G10L 17/04 (2013.01)
G10L 15/22 (2006.01)
G10L 17/00 (2013.01)
G10L 15/183 (2013.01)
G10L 15/08 (2006.01)

(52) U.S. Cl.
CPC .............. *G10L 15/22* (2013.01); *G10L 17/00* (2013.01); *G10L 17/04* (2013.01); *G10L 25/63* (2013.01); *G10L 15/222* (2013.01); *G10L 2015/088* (2013.01); *G10L 2015/223* (2013.01); *G10L 2015/227* (2013.01)

(56) References Cited

U.S. PATENT DOCUMENTS

| | | | | |
|---|---|---|---|---|
| 8,682,667 | B2 ‡ | 3/2014 | Haughay | G10L 15/22 704/246 |
| 8,983,383 | B1 ‡ | 3/2015 | Haskin | H04M 1/7253 455/41 |
| 9,043,199 | B1 * | 5/2015 | Hayes | G10L 15/26 704/10 |
| 9,147,399 | B1 ‡ | 9/2015 | Hart | G10L 17/08 |
| 9,148,394 | B2 ‡ | 9/2015 | Lynch | H04L 51/046 |
| 9,160,844 | B2 ‡ | 10/2015 | Bouzid | H04M 3/42178 |
| 9,189,742 | B2 ‡ | 11/2015 | London | G06Q 30/0613 |
| 9,633,649 | B2 * | 4/2017 | Bangalore | G10L 13/00 |
| 9,747,895 | B1 * | 8/2017 | Jansche | G10L 15/183 |
| 9,754,288 | B2 ‡ | 9/2017 | Kane, Jr. | G06N 5/02 |
| 9,922,642 | B2 * | 3/2018 | Pitschel | G10L 15/22 |
| 2003/0167167 | A1 ‡ | 9/2003 | Gong | G10L 15/22 704/25 |
| 2005/0125225 | A1 ‡ | 6/2005 | Manu | G10L 15/01 704/237 |
| 2007/0038436 | A1 ‡ | 2/2007 | Cristo | G06F 40/232 704/9 |
| 2010/0169091 | A1 ‡ | 7/2010 | Zurek | G06Q 30/02 704/235 |
| 2011/0289015 | A1 ‡ | 11/2011 | Mei | G06Q 10/04 705/347 |
| 2012/0072219 | A1 ‡ | 3/2012 | Johnston | G06F 17/30979 704/251 |
| 2012/0143362 | A1 * | 6/2012 | Shih | G06Q 30/02 700/94 |
| 2014/0038578 | A1 ‡ | 2/2014 | Bouzid | H04W 4/18 455/41 |
| 2014/0074454 | A1 ‡ | 3/2014 | Brown | G10L 15/22 704/9 |
| 2014/0244266 | A1 * | 8/2014 | Brown | G06F 3/167 715/764 |
| 2014/0278400 | A1 ‡ | 9/2014 | Coussemaeker | G10L 15/265 704/235 |
| 2014/0372401 | A1 ‡ | 12/2014 | Goldstein | G10L 25/54 707/70 |
| 2015/0025887 | A1 ‡ | 1/2015 | Sidi | G10L 17/02 704/245 |
| 2015/0088514 | A1 ‡ | 3/2015 | Typrin | G06F 3/167 704/24 |
| 2015/0169336 | A1 ‡ | 6/2015 | Harper | G10L 15/22 715/70 |
| 2015/0172463 | A1 ‡ | 6/2015 | Quast | G06Q 10/10 379/88 |
| 2015/0324352 | A1 ‡ | 11/2015 | Meyer | G06F 3/011 382/103 |
| 2015/0371665 | A1 ‡ | 12/2015 | Naik | G10L 25/87 704/248 |
| 2015/0382047 | A1 ‡ | 12/2015 | Van Os | G09C 1/00 725/38 |
| 2015/0382079 | A1 ‡ | 12/2015 | Lister | H04N 21/2387 725/38 |
| 2016/0026627 | A1 * | 1/2016 | Johnston | G10L 15/22 704/251 |
| 2016/0077794 | A1 ‡ | 3/2016 | Kim | G10L 15/20 704/27 |
| 2016/0336005 | A1 ‡ | 11/2016 | Cao | G06F 17/30867 |

OTHER PUBLICATIONS

PCT International Search Report and Written Opinion in International Application PCT/US2017/049346, dated Dec. 7, 2017, 15 pages.‡

"Integrating intelligence, in-car and out", Retrieved From: https://www.nuance.com/automotive.html, Jul. 12, 2016, 10 Pages.‡

JPO Machine Translation of JP2018/508885 A1, Japanese version of WO2017/016122 A1, Gu (effective / PCT filing year 2015). (Year: 2015).‡

Gu et al, machine translation of JP2018/508885 A1, Japanese version of WO2017/016122A1. (Year: 2015).‡

* cited by examiner
‡ imported from a related application

PERSONALIZATION OF EXPERIENCES WITH DIGITAL ASSISTANTS IN COMMUNAL SETTINGS THROUGH VOICE AND QUERY PROCESSING

CROSS-REFERENCE TO RELATED APPLICATIONS

This application is a continuation of U.S. patent application Ser. No. 15/253,762, filed on Aug. 31, 2016, which application is hereby incorporated herein by reference in its entirety.

BACKGROUND

Digital assistants have become increasingly useful as advancements in natural language processing and subsequent categorization of processed speech data have progressed. Digital assistants can surface on devices that serve multiple users and may receive queries and other input from each of the users in the group of users that they serve. The users of a digital assistant that receives input from a single device, or a single account associated with multiple devices, can vary in age, gender, country of residence and origin as well as multitude of other variable factors.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems, methods and devices for assisting with providing personalized experiences from voice analysis. A voice input from a user may be received. Acoustic patterns of the voice input may be analyzed. The identity of the user may be determined based on the acoustic analysis. At least one signal pertaining to a background characteristic of the user and at least one signal pertaining to a digital characteristic associated with the user may be extracted. Values may be assigned to the at least one extracted signal pertaining to the background characteristic of the user and the at least one extracted signal pertaining to the digital characteristic associated with the user. The voice input may be categorized into one or more topical categories using the assigned values and natural language speech processing and a personalized response related to the voice input may be provided.

BRIEF DESCRIPTION OF THE DRAWINGS

Non-limiting and non-exhaustive examples are described with reference to the following figures.

DETAILED DESCRIPTION

Figure 1:
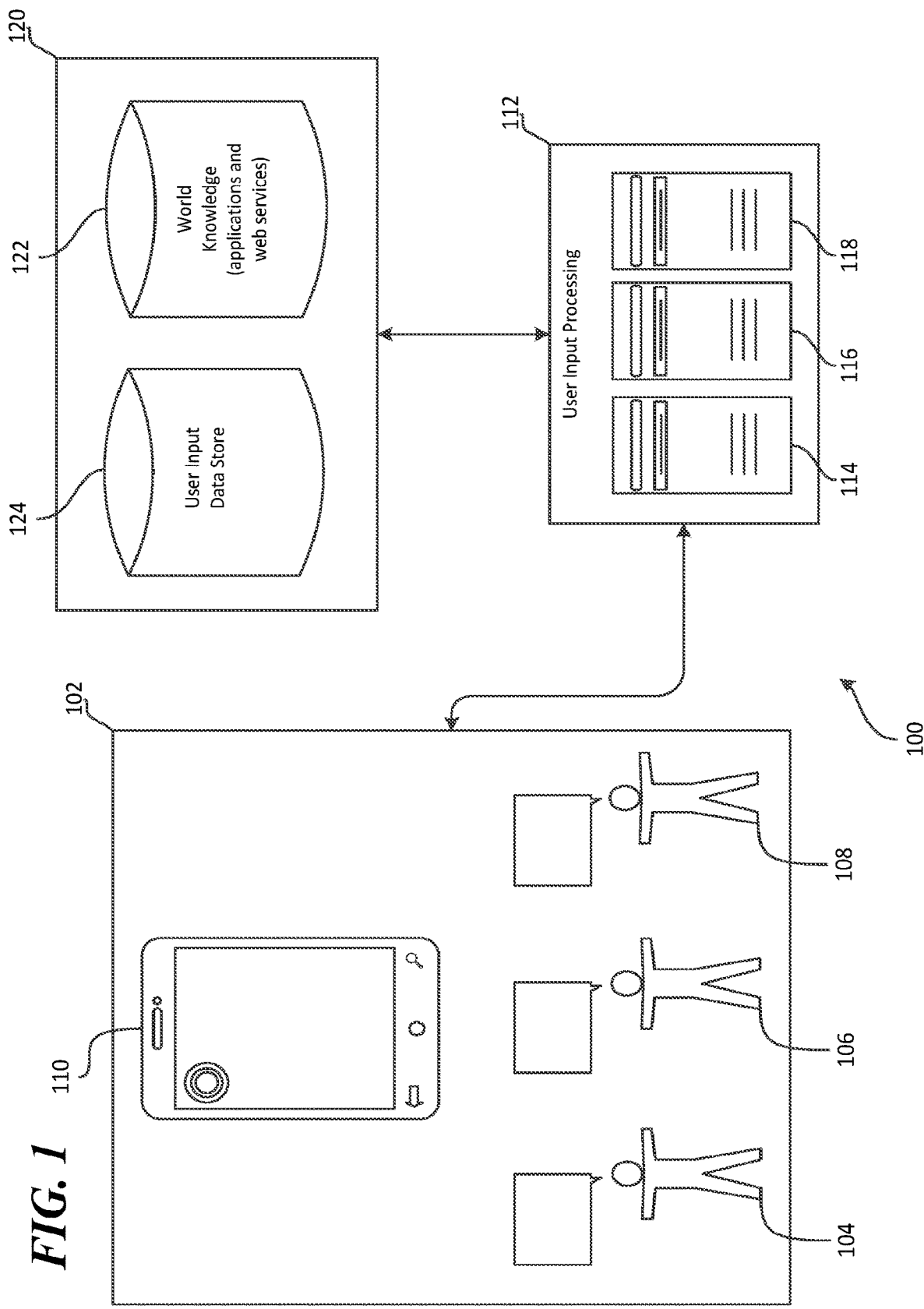
FIG. 1 is a schematic diagram illustrating an example distributed computing environment for providing personalized feedback from voice analysis from a plurality of users.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to speech and voice processing by digital assistants that may handle input from a plurality of users and providing personalized feedback and personalized experiences for each of those users. A first framework is provided for creating, storing and augmenting a machine learned voice profile for each of a plurality of users that access a digital assistant. A second framework is provided for creating, storing and augmenting a machine learned topical profile (i.e., a digital characteristic of the user) for each of a plurality of users that access a digital assistant.

According to examples, the first framework and the second framework may be merged and joined with voice query streams from each of a plurality of users of a digital assistant such that voice and topic level profiles may be implemented to provide personalized reactive and proactive responses tailored to each of the plurality of users of the digital assistant.

Further aspects of the present disclosure relate to speaker identification systems for digital assistants that employ voice and acoustic analysis to identify a specific user from a plurality of users of a digital assistant, thus eliminating the need for each user to proactively sign into a digital assistant account in order to obtain personalized responses and feedback from the digital assistant.

The systems and methods described herein may employ an offline component and a runtime component. According to examples, the offline component may take voice inventory (logs) for a group of users (e.g., a family, roommates, etc.) that access a digital assistant. Voice data from the group of users may be clustered and a determination may be made as to how many users are in the group of users that access the digital assistant. Speaker models may be built for each user corresponding to voice data received from each user. Voice data for each user may be run through a set of prebuilt models to gain more information about the user.

The offline component may analyze user input (e.g., user speech queries) and utilize natural language processing or other speech recognition models to transcribe and analyze speech input. The speech input may be clustered into a set of topics and each speech input may be run through a set of prebuilt topical models. For example, a speech input may be run through a model for each topic in a topical index (e.g., news, finance, music, etc.) and a determination may be made as to whether the speech input belongs to and matches identifying criteria (e.g., language patterns, keywords, key phrases, etc.) for a specific topic supported by a digital assistant implementing the systems and methods described herein. This component provides a topical view of what has been spoken by each user of a digital assistant user group (e.g., a family, roommates, etc.) and allows for the creation of a topic/query level profile for each individual user which may be accessed to provide a personalized experience for each user.

According to additional examples, a plurality of user background characteristic and trait models may be used to identify user background characteristics and traits for a specific user. For example, a prebuilt gender detection model may determine whether a specific user is male or female. An age detection model may determine the age or age group for a specific user. An accent detection model may determine an accent for a specific user (e.g., southern, immigrant, Indian, Chinese, German, French, etc.). Other user background characteristic models may also be used to identify additional background traits and characteristics of a user as more fully described below. This information may be compiled into a voice-based profile for each specific user of a group of users.

During the runtime component of the systems and methods described herein, when a user provides speech input to a digital assistant, a speaker identification component may determine the specific identity of the user, fetch a corresponding voice-based profile for the specific user, and determine whether it can issue relevant proactive feedback or a personalized response to the user based on a proactive suggestion engine.

A digital assistant according to an exemplary embodiment may receive a voice input from a user; analyze acoustic patterns of the voice input; determine, based on the acoustic analysis, the identity of the user; extract, from the voice input, at least one signal pertaining to a background characteristic of the user and at least one signal pertaining to a digital characteristic associated with the first user; assign values to the at least one extracted signal pertaining to the background characteristic of the user and the at least one extracted signal pertaining to the digital characteristic associated with the user; categorize the voice input into one or more topical categories using the assigned values and natural language speech processing; and provide a personalized response related to the voice input.

According to examples the processing of the voice input may be performed by a single device that receives the voice input such as a mobile computing device. According to other examples the processing of the voice input may be partially performed by the device that receives the input and partially by one or more separate devices such as server devices. In another example the speech processing may be performed entirely by separate devices such as server devices and the device that originally receives the voice input may simply pass the speech input, in digital form, to the server devices, receive the processed voice input back from the server devices and provide personalized responses back to a user.

Speech processing according to aspects described herein may be performed entirely during runtime, entirely offline or during runtime and offline. For example, acoustic patterns of a voice input may be analyzed at runtime to determine the identity of the user that provided the voice input, an initial categorization of the voice input may be made at runtime, and a response related to the voice input and the categorization may be reactively passed back to the user in during runtime.

Further acoustic processing and speech and language pattern analysis may be performed on voice, text and gesture input and a determination of whether user input corresponds to a number of categories may be made. For example, acoustic processing and speech pattern and language analysis may be performed such that certain background characteristics and traits of a user may be identified such as age of the user, gender of the user, accent assignment of the user, physical characteristics of the user, social characteristics of the user and emotional state of the user, among others. Machine learning may be used to create voice, speech and language pattern models that may be used to identify a user and assist with categorization of received input. Machine learning may also be used to categorize user input based on natural language processing and identification of one or more personalized topical categories for a user. Further processing of the received voice input may be performed during runtime or offline based on that analysis.

Values may be assigned to identified user background traits and characteristics such that further categorization of user input may be made and topically categorized input may be stored such that personalized feedback and responses related to those characteristics, traits and user input may be provided back to the user in a reactive or proactive manner. The categorized data may be supplemented with world knowledge, such as information from the Internet and the world wide web. For example, a web search related to the categorized data may be created and run and one or more most relevant results or relevant information extracted from those results as it relates to the categorized data may be provided to the user.

Categorized user input may be supplemented with past input and categorization of that past input from the user. For example, past user input may have been topically categorized as well as supplemented with world knowledge to create a personalized data store comprised of topically categorized user input in a tiered hierarchical topical index. The tiered hierarchical index may include primary topical categories such as travel, finance, sports, entertainment, dining, events, etc., in which user input is stored and supplemented with additional information.

Upon topically categorizing user input into one or more first level topical categories, further categorization into deeper, more refined, tiers in the assigned topical categories may then be made. For example, if user input has been topically categorized at a first level into an entertainment category, it may then be further categorized into lower topical tiers such as movies, television, music, etc. Upon assigning the user input into one or more topical categories the user input may be tagged with searchable metadata indicating it is associated with one or more topical categories in a tiered hierarchical index such that it can readily be surfaced to a user as feedback upon receiving an indication to provide such feedback to the user.

Categorization of user input may employ various techniques, alone or in combination, in determining which topical categories and sub-categories should be associated with that input. One such technique involves the application of natural language processing. For example, one or more natural language processing models may receive user input and evaluate the context of that input.

Another technique that may be used in categorizing user input involves machine learning. Machine learning may identify patterns from user input, such as speech and language patterns, writing style patterns, as well as previous categorization of similar input from that user, in addition past user feedback in order to accurately identify appropriate context of a user input and appropriate categorization of that input.

An indication to provide feedback to a user may be received in the way of a reactive natural language query from a user, such as a user providing a digital assistant (e.g., Cortana, Siri, Alexa, etc.) with a query or request. For example, a user may provide a digital assistant with a spoken request such as "show me directions to get home" or a spoken query such as "what sports programs are on right now?" The digital assistant according to other examples may receive textual and gesture input from a user.

Acoustic patterns may be analyzed for voice input and based on that analysis a determination may be made as to the specific identity of that user. Additional voice analysis may be performed on the voice input such that additional identification of various user background characteristics and traits may be made. Such background characteristics and traits that may be identified for a user include gender, age group, accent or accent group, height and other physical characteristics, social characteristics and emotional state, among others. For example, acoustic patterns, speech patterns, language use and language patterns, past user input, and GPS and IP addresses where input has been logged for the user (e.g., coordinates received from a user's mobile computing device) may be analyzed to create a unique user profile for the user which may be used to further categorize user input and return relevant feedback to the user. Such information may be stored over time and a user profile based on these characteristics may change based on each input that digital assistant receives for the user.

In the example above for the spoken request "show me directions to get home," the systems and methods described herein may analyze acoustic patterns associated with the voice input and based on that analysis identify the specific user that has made the spoken request. Additionally or alternatively, one or more user stores associated with a device or a digital assistant being accessed may be analyzed to match characteristics (e.g., speech patterns, frequent request subject matter, etc.) of the input to a specific user associated with the device or the digital assistant such that an identification of the specific user that has made the spoken request can be made.

According to an additional example, a user may ask a digital assistant implementing the systems and methods described herein for running shoe suggestions. Based on an analysis of the user's background characteristics and traits and/or the user's personal user store, a determination may be made that the user is a female and she has previously shown interest in Nike and Saucony shoes. In this example, the digital assistant may provide a list of women's running shoes that are available for purchase, with Nike and Saucony ranked highest, as well as a link to an online store at which those shoes may be purchased. If the user views a particular size of shoe and/or makes a purchase of that shoe, that information may further be categorized in a tiered hierarchical index in the user's personal user store such that information related to the size, brand, type of running shoe (e.g., trail running vs. street running), etc. may be utilized at a later time in providing even more personalized feedback to the user.

If the user making the request has not previously accessed the digital assistant a new user profile may be created for the user and identification of additional background characteristics and traits (e.g., gender, age group, accent or accent group, height, social characteristics, and emotional state, etc.) may be made for the user and stored as part of a personal user store. If the user making the request has previously accessed the digital assistant, that user's personal user store may be updated based on the input analysis. For example, the input itself may be categorized into a tiered hierarchical index and one or more additional characteristics and traits (gender, age group, accent or accent group, height, social characteristics, and emotional state, etc.) may be updated based on the current user input.

Values may be associated with user background characteristics and traits such that topical categorization of the input can be properly performed in the tiered hierarchical index, relevant information (e.g., world knowledge) can be retrieved to supplement the categorized data, and relevant feedback can be provided to the user. For example, if a determination is made that the user has a history of being anxious when the user travels and/or current voice analysis indicates that the user is currently anxious, a suggestion to take a scenic route home may be provided rather than a route that may be faster but which also has higher traffic rates.

In the example of a user query relating to what sports programs are on right now, an accent detection model may indicate that the user has an Australian accent and/or past user input and categorization of that input into a topical index may indicate that the user is interested in rugby. In this scenario a reactive response may provide a ranked list of sports programs that are currently on with Olympic rugby ranked higher than other sports, such as football or basketball.

In addition to receiving an indication to provide feedback in a reactive manner, an indication to provide feedback may be received in a proactive manner such as receiving longitude and latitude coordinates from a user's mobile computing device, receiving an input related to one or more topical categories in a tiered contextual hierarchy for a personal user store, temporal information associated with a received input that indicates that feedback is likely to be useful for completing a task, etc. For example, a user may provide a digital assistant with a request such as "play me a Taylor Swift song," and in addition to playing a Taylor Swift song for the user, the digital assistant may also ask whether the user is interested in the details of an upcoming Taylor Swift concert that is nearby as indicated by GPS data received from the user's mobile computing device.

In providing feedback to a user various filters may be applied such that inappropriate responses, suggestions and answers, which may otherwise be relevant to a user based only on processing of the user's input, are not provided to a user. According to examples such filters may make determinations based on certain identified user background characteristics and traits to ensure that only appropriate feedback for that user is provided to that user. Filters that may be applied include age appropriate content filters (e.g., certain language may be deemed to complex or too adult-oriented for one or more age groups), preference filters (e.g., a user's personal user profile may indicate that the user does not like R-rated horror movies even if they are over 17 years old), sexual content filters, and profanity filters, among others.

FIG. 1 is a schematic diagram illustrating an example distributed computing environment 100 for providing personalized feedback from voice analysis and other user input received from a plurality of users. Distributed computing environment 100 includes a user-digital assistant context 102, a user input processing context 112 and a storage-augmentation context 120. User-digital assistant context 102 includes computing device 110 and users 104, 106 and 108. Computing device 110 may be a tablet, a mobile phone, a personal computer or other computing device that may access a digital assistant and a personal user store for each of users 104, 106 and 108 (e.g., a family, roommates, etc.). Additionally or alternatively, distributed computing environment may comprise a plurality of computing devices 110 which may access a single digital assistant linked to one digital assistant account containing personal user stores for each of users 104, 106 and 108.

According to examples personal user stores containing categorized information related to past user input for each users 104, 106 and 108 may reside in a data repository such as user input data store 124. That is, each of users 104, 106 and 108 have a unique personal user store which contains their past user input and a tiered hierarchical index containing user input which has been categorized topically. Categorized user input may be augmented with world knowledge 122 and user information from user data sources such as calendars, email, user image capture applications, user video capture applications, applications that access user device location sensors, contact lists etc.

Each of personal user stores for users 104, 106 and 108 may contain information related to unique speech and language characteristics that can be used to more accurately classify user input, obtain relevant augmentation information (e.g., world knowledge) for categorized information, and provide tailored feedback to the user based on those characteristics. Such characteristics which may be identified may include gender, age group, accent or accent group, height, social characteristics, and emotional state, among others.

User input processing context 112 contains computing devices such as servers 114, 116 and 118 which may identify and analyze acoustic patterns, and speech and language patterns associated with users' 104, 106 and 108 voice, text and gesture input received by computing device 110. For example, user input processing context 112 may receive user input from computing device 110, analyze acoustic patterns from a user's voice input, and determine, based on that analysis, the identity of the user as user 104, 106 or 108. User input processing context may augment content stored in a personal user store with information from a current user input as well as topically categorize the user input in a tiered hierarchical index.

User input processing context 112 may further determine personalized feedback and responses that may be relevant to a user in a reactive or proactive context and provide such feedback to the user via a network and computing device 110. User input processing context 112 and one or more of servers 114, 116 and 118 may determine relevant feedback to provide to one of users 104, 106 and 108 based a user's current input, past topical categorization of user input, augmentation of past user input and identified background characteristics and traits for that user such as gender, age group, accent or accent group, height, social characteristics, and emotional state, among others. According to examples each of the characteristics associated with a user may be determined by one or more of voice analysis, speech pattern analysis, language pattern analysis and categorization of user input into categories related to each characteristic.

Figure 2:
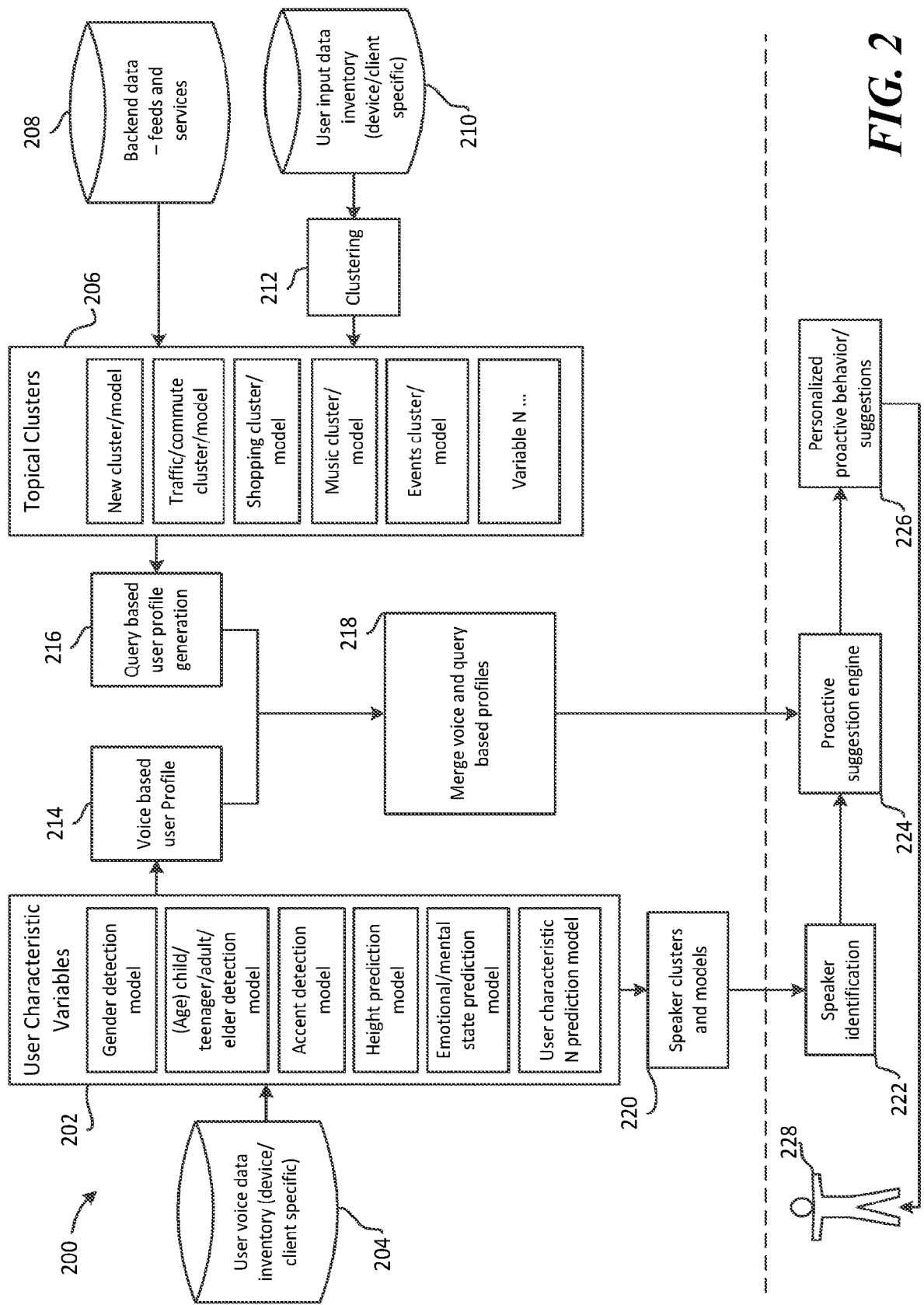
FIG. 2 is an exemplary diagram illustrating the merging of user background characteristics and traits identified from voice processing and topical categorization of user input for producing personalized proactive suggestions.

FIG. 2 is an exemplary diagram 200 illustrating the merging of user background characteristics and traits identified from voice processing and topical categorization of user input for producing personalized proactive suggestions. According to the illustrated example, user voice input is provided to user voice data inventory 204 and fed through a plurality of user characteristic variable models at 202. Exemplary user characteristic variable models include a gender detection model, an age detection model, an accent detection model, a height prediction model, an emotional and mental state prediction model, and additional user characteristic N prediction models. Upon identifying one or more user background characteristics and traits at 202 a voice profile for a specific user of a digital assistant is created at 214.

On the right side of exemplary diagram 200 user input is provided to user input data inventory 210 and user input is clustered at 212 by, for example, performing natural language processing of user input and clustering it into topical clusters 206. Topical clusters as shown in exemplary diagram 200 include a new cluster/model, which may be identified by machine learning for a specific user, a traffic/commute cluster/model, a shopping cluster/model, an events cluster/model and variable cluster/model N. Clustered user input may be augmented with additional information from, for example, backend data 208, which may include relevant data corresponding to topical clusters 206 obtained from the world wide web and other application feeds and services from which relevant data may be accessed. Clustered and augmented user input may be compiled into a query based user profile at 216 and at 218 a specific user's voice based user profile 214 and query based user profile 216 may be merged.

According to examples the dotted line in exemplary diagram 200 provides a visual representation of offline and runtime processing of the systems and methods described herein. Specifically, everything shown above the dotted line may be performed offline and everything below the dotted line may be performed at runtime. Accordingly, user characteristic variables identified for a specific user may be grouped into speaker cluster models 220 in an offline manner and speaker identification by which a specific user is identified at 222 may be performed during runtime. During runtime, after identifying a specific speaker at 222, a proactive suggestion engine 224 may analyze past and present user input for a specific user and at 226 provide one or more proactive suggestions to specific user 228 based on the voice and query based profiles that were merged at 218.

Figure 3:
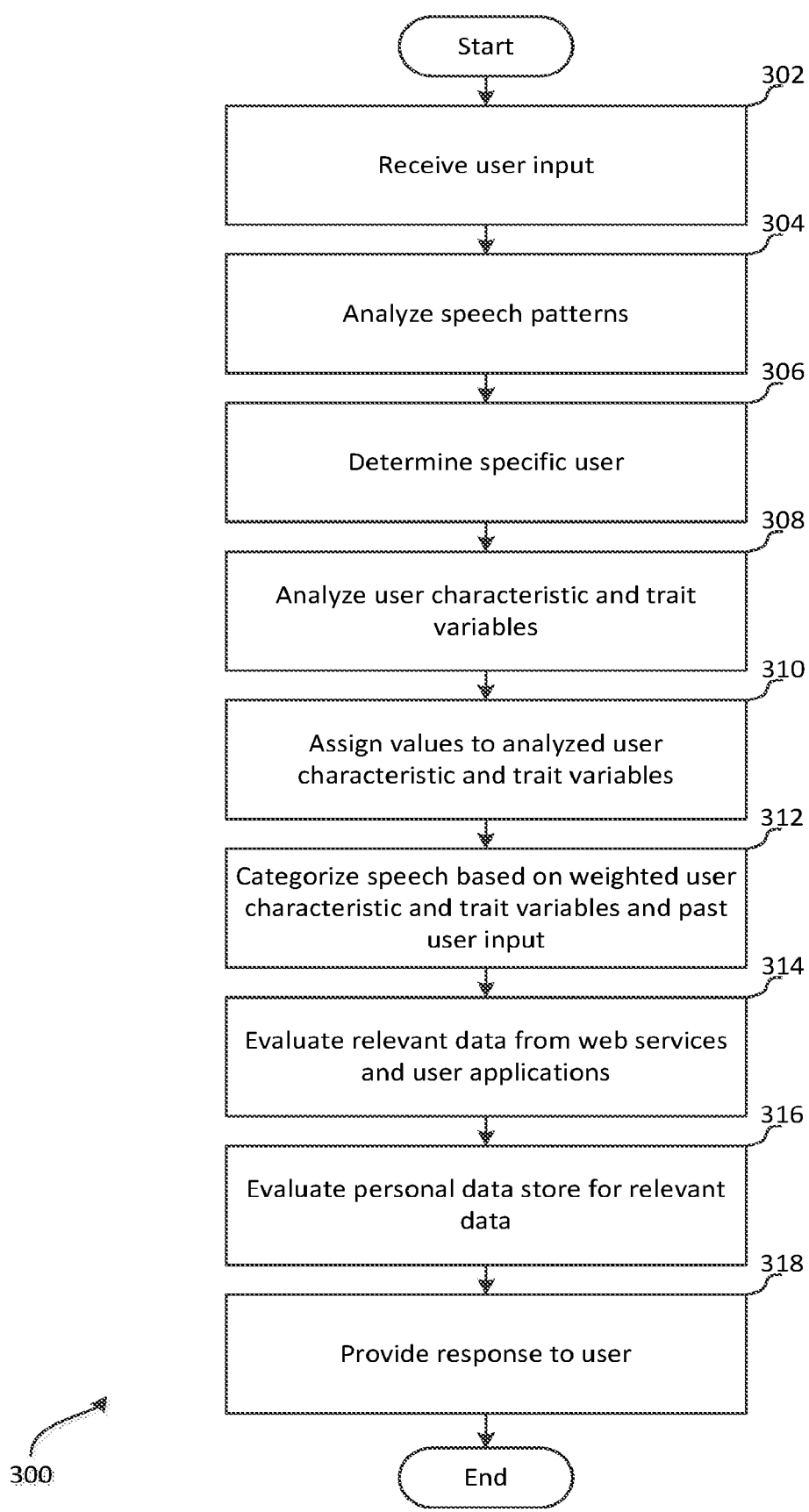
FIG. 3 is an exemplary method for providing personalized feedback from voice analysis.

FIG. 3 is an exemplary method for providing personalized feedback from voice analysis. The method begins at a start operation and moves to operation 302 where a user query is received. According to this exemplary method the user input is a voice input, however the systems and methods described herein may also receive text and gesture input in accordance with the scope of this disclosure.

From operation 302 flow moves to operation 304 where speech patterns for the voice input are analyzed. Such speech patterns may include language patterns as well as acoustic patterns associated with the speech input such as frequency, amplitude and wave length. From operation 304 flow moves to operation 306 where a determination is made as to the specific identify of the user that generated the input. The determination of the specific identify of the user may be made using one or more of an acoustic analysis of the voice, an analysis of speech and language patterns associated with the received input and natural language processing of the received input. The determination of the specific identity of the user may also involve comparing one or more of the acoustic analysis of the voice, the analysis of speech and language patterns associated with the received input and natural language processing of the input to a personal user store of information previously input into the system to determine whether the input matches one or more topical categories or background characteristics and traits associated with a user to a prescribed threshold value such that a positive identification of the user may be made.

From operation 306 flow continues to operation 308 where user background characteristic and trait variables for the received input are analyzed. Specifically, voice, speech and language analysis may be performed on the received input and a determination may be made based on that analysis that one or more user background characteristic and trait variables have been identified for the user such as gender, age group, accent or accent group, height, social characteristics, and emotional state, among others.

From operation 308 flow moves to operation 310 where values are assigned to each of the background characteristics and traits for the received speech input based on one or more of voice, speech and language analysis of the user input. For example, natural language processing models, voice analysis models, etc. may be run on the user input and a determination may be made to place a high value, relating to a high likelihood, that the user is a male and a high value, relating to a high likelihood, that the user is between the ages of seven and thirteen. Other values relating to other characteristics and variables may also be made based on the same analysis or additional voice, speech and language analysis.

From operation 310 flow moves to operation 312 where the user input is topically categorized based on weighted user background characteristic and trait variables and past user input. For example, based on natural language processing models and value assignment to various identified user background characteristics and traits based on the current user input as well as prior categorization of user input and prior value assignment to previously identified and weighted user background characteristics and traits, certain topical categories in a tiered hierarchical index (e.g., travel, finance, event, etc.) may be identified that the current input, or portions of the input, may relate to. Sub-topical categories within the tiered hierarchical index (e.g., airline travel, car travel, train travel, etc.) may also be identified within the tiered hierarchical index and the user input may be topically categorized therein in a more refined manner.

Moving from operation 312 flow continues to operation 314 where relevant data relating to categorized user input is identified from web services, user applications and data feeds. For example, a search engine may take key words from categorized user input or extracted portions of categorized user input which are further processed to create one or more search strings that may be provided to a search engine on the world wide web to identify information that may be relevant to categorized user input and provided back to a user as feedback.

From operation 314 flow continues to operation 316 where a personal data store for the user that provided the input is evaluated for information that is relevant to the topically categorized user input. The personal data store may comprise a personal user store containing previously topically categorized user input, identified background characteristics and traits for the user, as well as user information from other programs and applications such as emails, web searches, contact lists, calendars, etc.

Moving from operation 316 flow continues to operation 318 where a response related to the user input is provided to the user. According to some examples the response may be provided reactively in response to, for example, a query or a request for information. According to additional examples the response may be proactive and related to, for example, receiving user input that is related to world knowledge, previously topically categorized user input or other information contained in the user's personal data store. From operation 318 flow continues to and end operation and the method ends.

Figure 4:
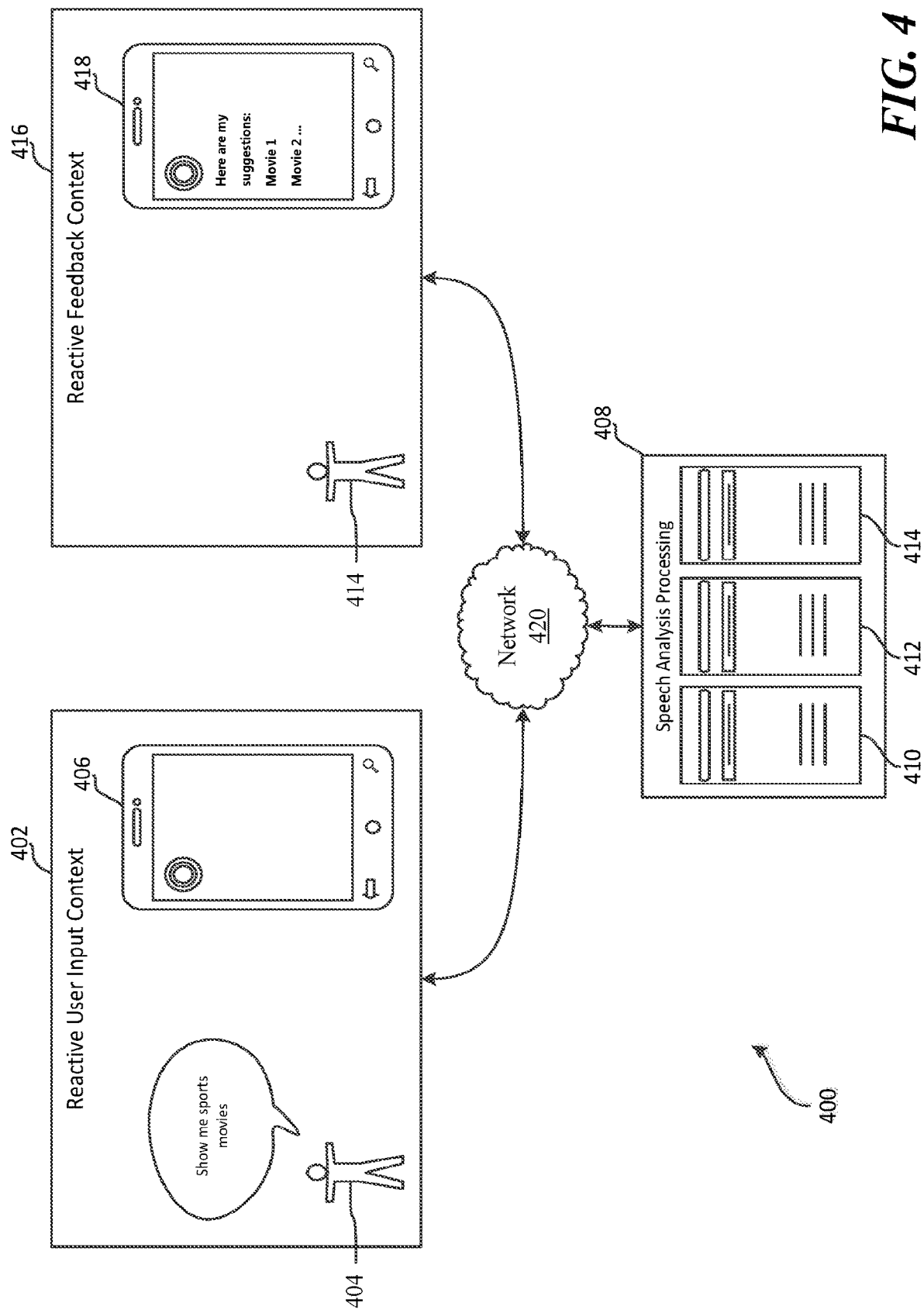
FIG. 4 illustrates an example scenario for providing personalized feedback in a reactive context to a user based on speech input and voice analysis.

FIG. 4 illustrates an example scenario 400 for providing personalized feedback in a reactive context to a user based on speech input and voice analysis. Example scenario 400 contains reactive user input context 402, network 420, speech analysis processing context 408 and reactive feedback context 416. Reactive user input context 402 includes user 404 who has utilized computing device 406 and a digital assistant in communication with computing device 406 to input the request that the digital assistant show her sports movies.

According to examples, the user's 404 request may be sent to speech analysis processing context 408 and one or more of servers 410, 412 and 414 for processing of that request. In the speech analysis processing context 408 an identification may be made as to the specific user making the request by, for example, analyzing acoustic patterns associated with the user's voice input request, comparing speech and language patterns associated with the request to stored patterns in personal user stores associated with a digital personal assistant account or the computing device 406, as well as matching identified user background characteristics and traits based on the current user input to past identified user background characteristics and traits such as age group, gender, accent type, etc. in personal user stores associated with a digital assistant account or the computing device 406.

One or more natural language processing models may be run on the voice input and keywords and phrases may be identified as being relevant to one or more previously topically categorized user inputs related to the current user input. Such categories may contain indications of sports that the individual is interested in, types of movies (e.g., drama, comedy, action, rating type, etc.) that the user is interested in, as well as other information relevant to the request. A determination may also be made based on previously topically categorized user input, as well as the current identified background characteristics and traits of the user input and previously identified background characteristics and traits of the user (e.g., accent) that the user may be more interested in rugby drama movies than football comedy movies.

World knowledge may be accessed to determine relevant sports movies that are available for rent and a personal data store for the user may be accessed to determine whether the user already owns digital copies of sports movies that may be of interest to the user. Upon making these determinations the sports movies may be ranked based on a likelihood that the user will be interested in watching the movies and a list of movies may be provided from speech analysis processing context 408, via network 420, to reactive feedback context 416 where the movie suggestions are displayed on computing device 418 for user 414 in that context.

Figure 5:
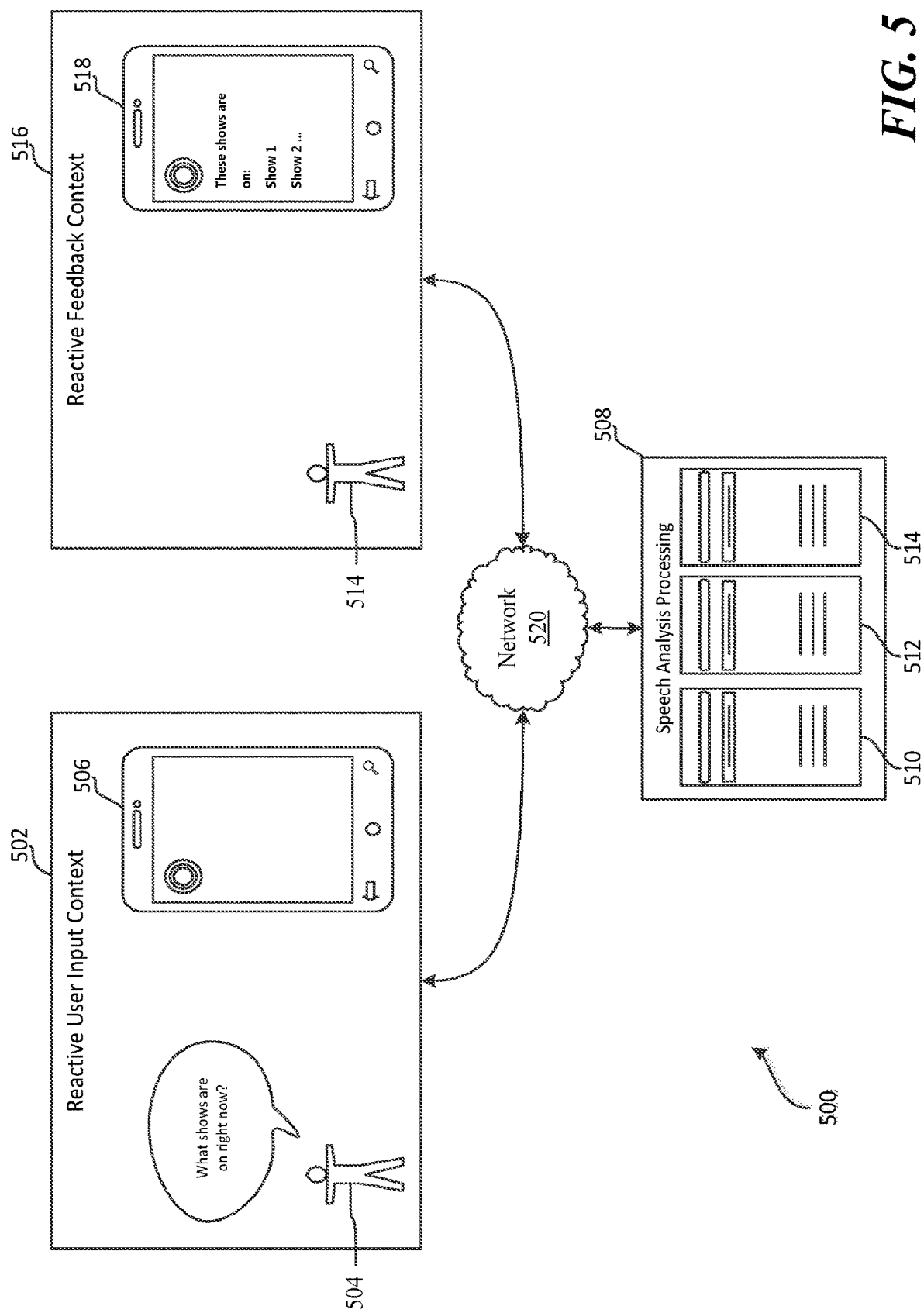
FIG. 5 illustrates an example scenario for providing personalized feedback in a reactive context to a user based on speech input and voice analysis.

FIG. 5 illustrates an example scenario 500 for providing personalized feedback in a reactive context to a user based on speech input and voice analysis. Example scenario 500 contains reactive user input context 502, network 520, speech analysis processing context 508 and reactive feedback context 516. Reactive user context 502 includes user 504 who has utilized computing device 506 and a digital assistant in communication with computing device 506 to input the query: "What shows are on right now?"

According to examples, the user's 504 query may be sent to speech analysis processing context 508 and one or more of servers 510, 512 and 514 for processing of that request. In the speech analysis processing context 508 an identification may be made as to the specific user making the query by, for example, analyzing acoustic patterns associated with the user's voice input query, comparing speech and language patterns associated with the request to stored patterns in personal user stores associated with a digital assistant account or the computing device 506, as well as matching identified user background characteristics and traits based on the current user input to past identified user background characteristics and traits such as age, gender, accent type, etc. in personal user stores associated with a digital personal assistant or the computing device 506.

One or more natural language processing models may be run on the voice input and keywords and phrases may be identified as being relevant to one or more previously topically categorized user inputs related to the current user input. Such topical categories may contain indications of television shows that the individual may be interested in (news, historical dramas, sitcoms, live events, etc.), network stations that the user may be interested in (e.g., Fox News, CNN, ESPN, ABC, etc.), as well as other information relevant to the query. A determination may also be made based on previously identified user background characteristics and traits (e.g., age, political affiliation, etc.) that the user may be interested more in conservative news programs (e.g., Fox News) than more liberal news programs (e.g., CNN).

World knowledge may be accessed to determine relevant shows that may currently be on television or that may be accessed on demand and user information from the user's calendar application may be accessed to determine the length of time that the user has available for watching a show. Upon making these determinations the shows may be ranked based on a likelihood that the user will be interested in watching them, as well as the duration of the shows in relation to the user's determined availability, and a list of relevant shows may be provided from speech analysis processing context 508, via network 520, to reactive feedback context 516 where the show suggestions are displayed on computing device 518 for user 514 in that context.

Figure 6:
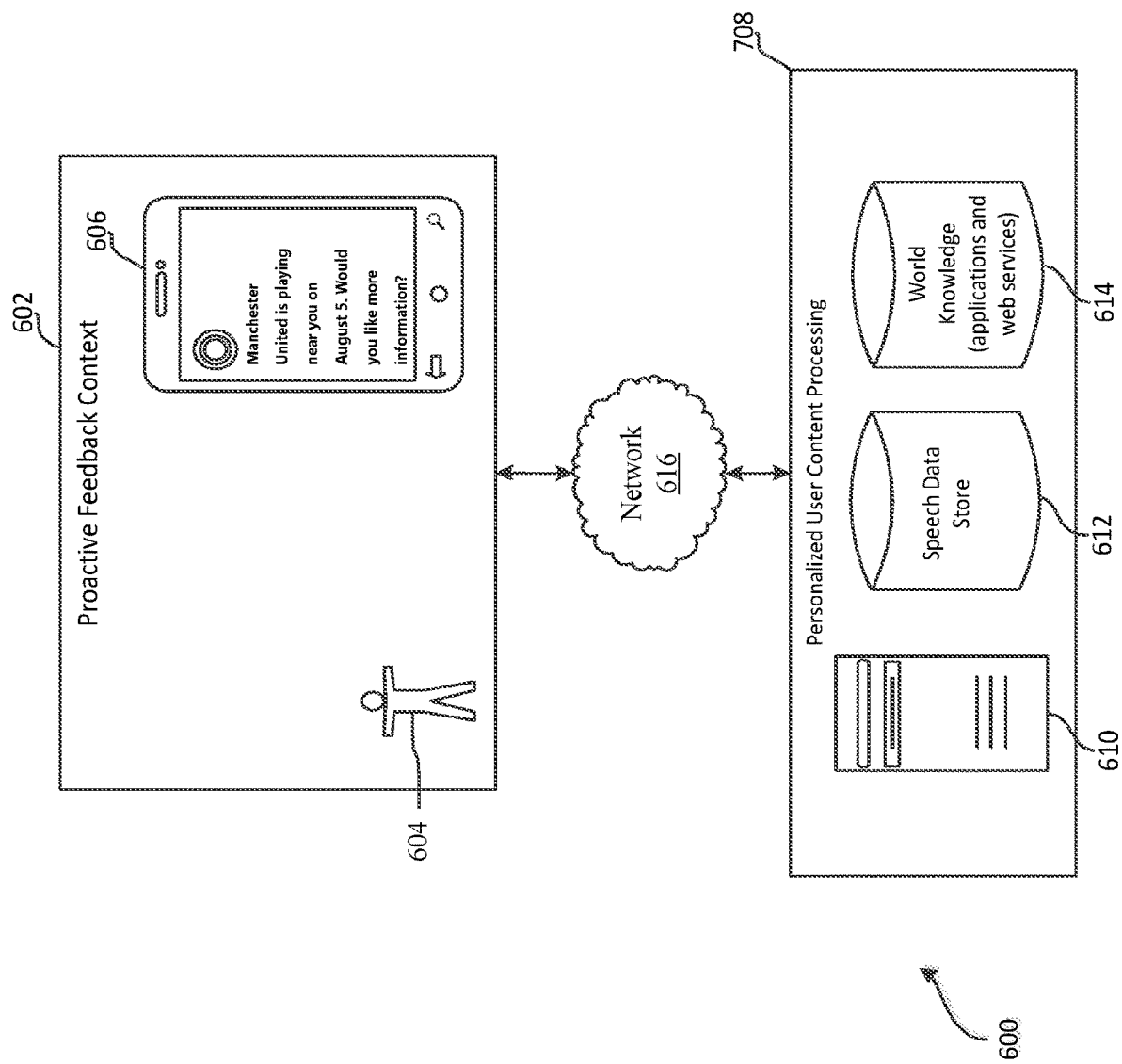
FIG. 6 illustrates an example scenario for providing personalized feedback in a proactive context to a user based on speech input and voice analysis supplemented with past user data and world knowledge.

FIG. 6 illustrates an example scenario 600 for providing personalized feedback in a proactive context to a user based on speech input and voice analysis supplemented with past user data and world knowledge. Example scenario 600 contains proactive feedback context 602, network 616, personalized user content processing context 608 which contains one or more servers 610 for processing user input, speech data store 612 and world knowledge 614 from applications and web services.

According to examples user 604 may have previously provided a digital assistant, via computing device 606, with input which was subsequently topically categorized in a tiered hierarchical index and stored in speech data store 612. The topically categorized user input may include a variety of topical categories related to past user input, such as sports and sports teams, that may be of interest to user 604 during proactive feedback context 602. Topical categorization of past user input in speech data store 612 may have been weighted by, for example, assigning values to various identified user background characteristics and traits for user 604 such as accent type. According to this example an accent type may have been identified for user 604 which indicates that user 604 has an English accent and topically categorized past user input in speech data store 612 may indicate that user 604 is likely interested in the Manchester United Football Club. In addition to making these determinations, the systems and methods as described herein may access user information from emails, contact lists, images and calendars that indicate that the user likely attended one or more Manchester United matches or expressed interest in attending one or more Manchester United matches.

One or more servers 610 may access world knowledge related to topically categorized user input in speech data store 612 and based on, for example, GPS coordinates received from computing device 606 received via network 616, determine based on a targeted search on the world wide web utilizing information from the speech data store, that Manchester United has a match coming up at a location near user 604. Upon making this determination a notification may be sent to computing device 606 via network 616 that Manchester United is playing near user 604 on August 5 and that information may be provided, via a digital assistant in communication with computing device 606, to user 604.

Figure 7:
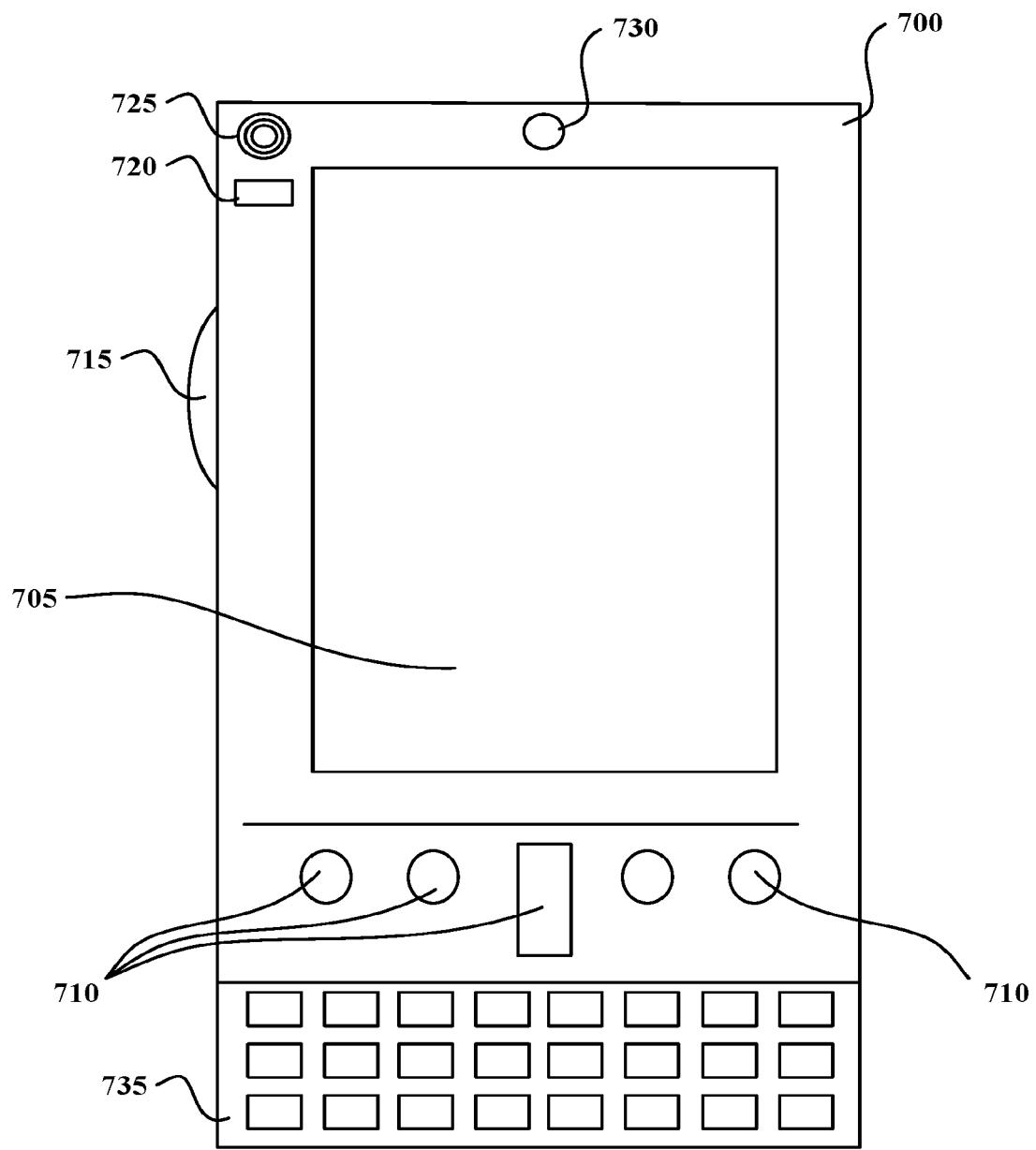
FIG. 7 illustrates a computing device for executing one or more aspects of the present disclosure.
Figure 8:
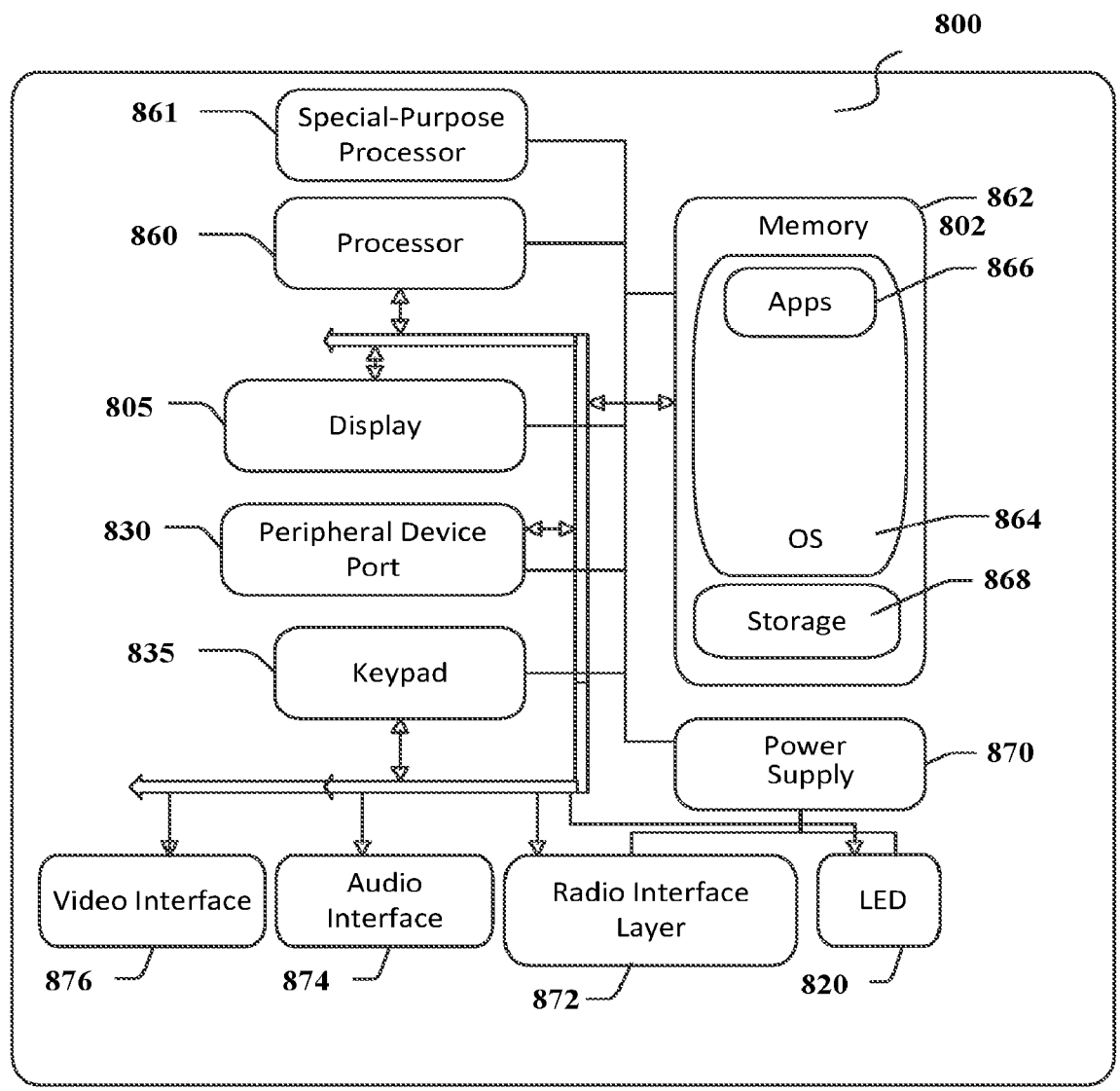
FIG. 8 is a simplified block diagram of a computing device with which aspects of the present disclosure may be practiced.

FIG. 7 and FIG. 8 illustrate computing device 700, for example, a mobile telephone, a smart phone, a tablet personal computer, a laptop computer, and the like, with which embodiments of the disclosure may be practiced. With reference to FIG. 8, an exemplary mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the computing device 700. The display 705 of the mobile computing device 700 may also function as an input device (e.g., a touch screen display). If included, an optional side input element 715 allows further user input. The side input element 715 may be a rotary switch, a button, or any other type of manual input element.

In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode) and/or an audio transducer 725 (e.g., a speaker). In some embodiments, the mobile computing device 700 incorporates a vibration transducer for providing the user with tactile feedback. In yet another embodiments, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 705.

FIG. 8 is a block diagram illustrating the architecture of one embodiment of a mobile computing device. That is, the mobile computing device 800 can incorporate a system (i.e., an architecture) 802 to implement some aspects of the disclosure. In one aspect the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and a wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, diagramming applications, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like.

A synchronization application (not shown) also resides on the system 802 and is programmed to interact with a corresponding synchronization application resident on a host computer to keep the information stored in the non-volatile storage area 868 synchronized with corresponding information stored in the host computer. As should be appreciated, other applications may be loaded into the memory 862 and run on the mobile computing device 800, including steps and methods for providing personalized feedback from voice analysis and other user input.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the functions of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa. The radio 872 allows the system 802 to communicate with other computing devices such as over a network. The radio 872 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 802 provides notifications using the visual indicator 720 that can be used to provide visual notifications and/or an audio interface 874 producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868. Computer storage media may include volatile and nonvolatile, removable and non-removable media implemented in any method or technology for storage of information, such as computer readable instructions, data structures, program modules, or other data.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 802 may vary and may include more or fewer components than those described in FIG. 8. In some examples, interfacing between components of the system 802 may occur remotely, for example where components of system 802 may be spread across one or more devices of a distributed network. In examples, one or more data stores/storages or other memory are associated with system 802. For example, a component of system 802 may have one or more data storages/memories/stores associated therewith. Data associated with a component of system 802 may be stored thereon as well as processing operations/instructions executed by a component of system 802.

Figure 9:
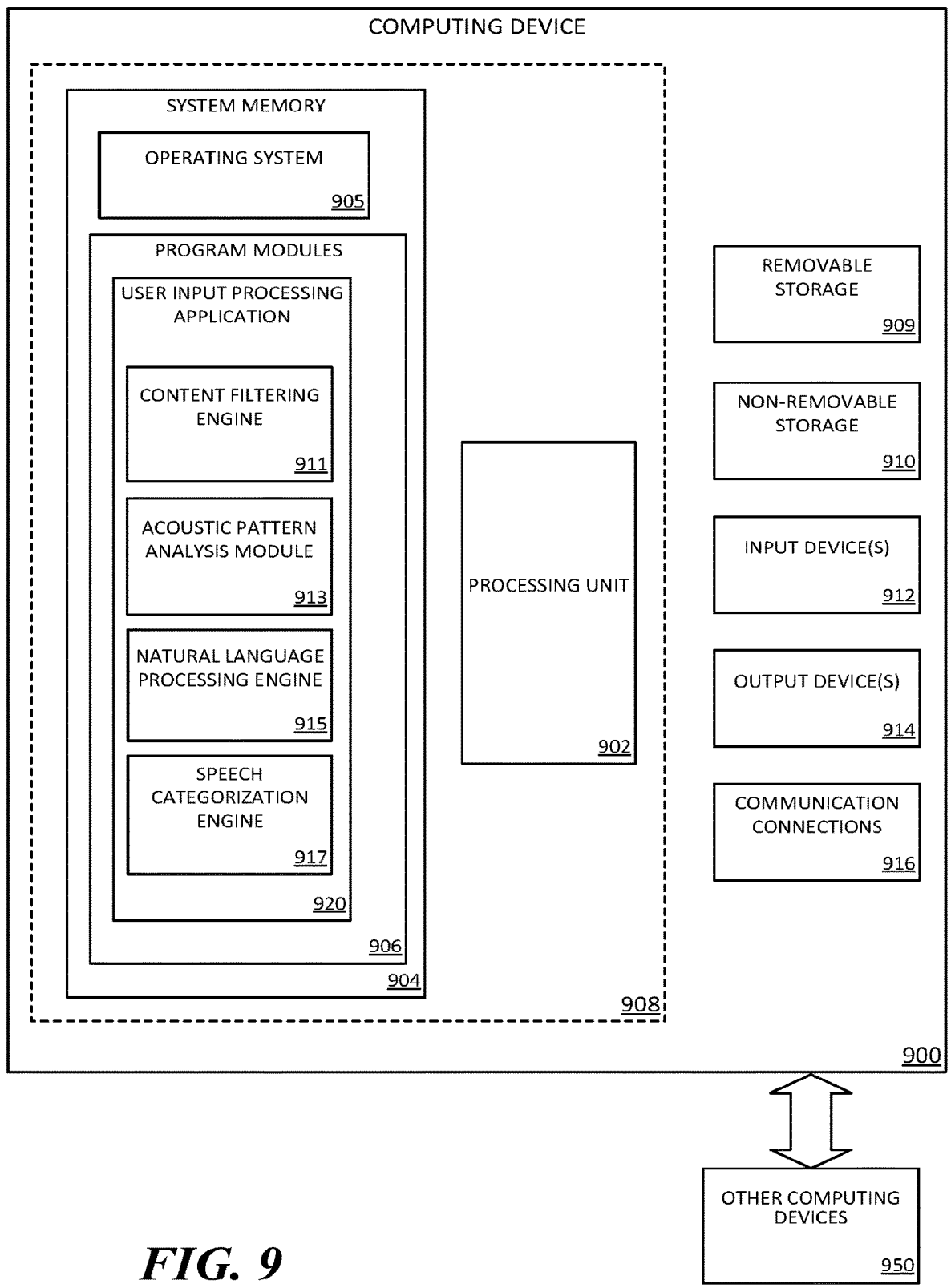
FIG. 9 is a block diagram illustrating physical components (e.g., hardware) of a computing device 900 with which aspects of the present disclosure may be practiced.

FIG. 9 is a block diagram illustrating physical components (e.g., hardware) of a computing device 900 with which aspects of the disclosure may be practiced. The computing device components described below may have computer executable instructions for providing personalized experience from voice analysis and other user input including receiving a voice input from a user; analyzing acoustic patterns of the voice input; determining, based on the acoustic analysis, the identity of the user; extracting, from the voice input, at least one signal pertaining to a background characteristic of the user and at least one signal pertaining to a digital characteristic associated with the first user; assigning values to the at least one extracted signal pertaining to the background characteristic of the user and the at least one extracted signal pertaining to the digital characteristic associated with the first user; categorizing the voice input into one or more topical categories using the assigned values and natural language speech processing; and providing a personalized response related to the voice input, including computer executable instructions for user input processing application 920 that can be executed to employ the methods disclosed herein.

In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for user input processing application 920, such as one or more components in regards to FIG. 9 and, in particular, content filtering engine 911, acoustic pattern analysis module 913, natural language processing engine 915 and speech categorization engine 917.

The operating system 905, for example, may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., user input processing application 920) may perform processes including, but not limited to, the aspects, as described herein. Other program modules that may be used in accordance with aspects of the present disclosure, and in particular may include user characteristic identification modules and user characteristic value assignment modules, among others.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 904. While executing on processing unit 902, program modules (e.g., applications, Input/Output (I/O) management, and other utilities) may perform processes including, but not limited to, one or more of the operational stages of the methods described herein.

Figure 10:
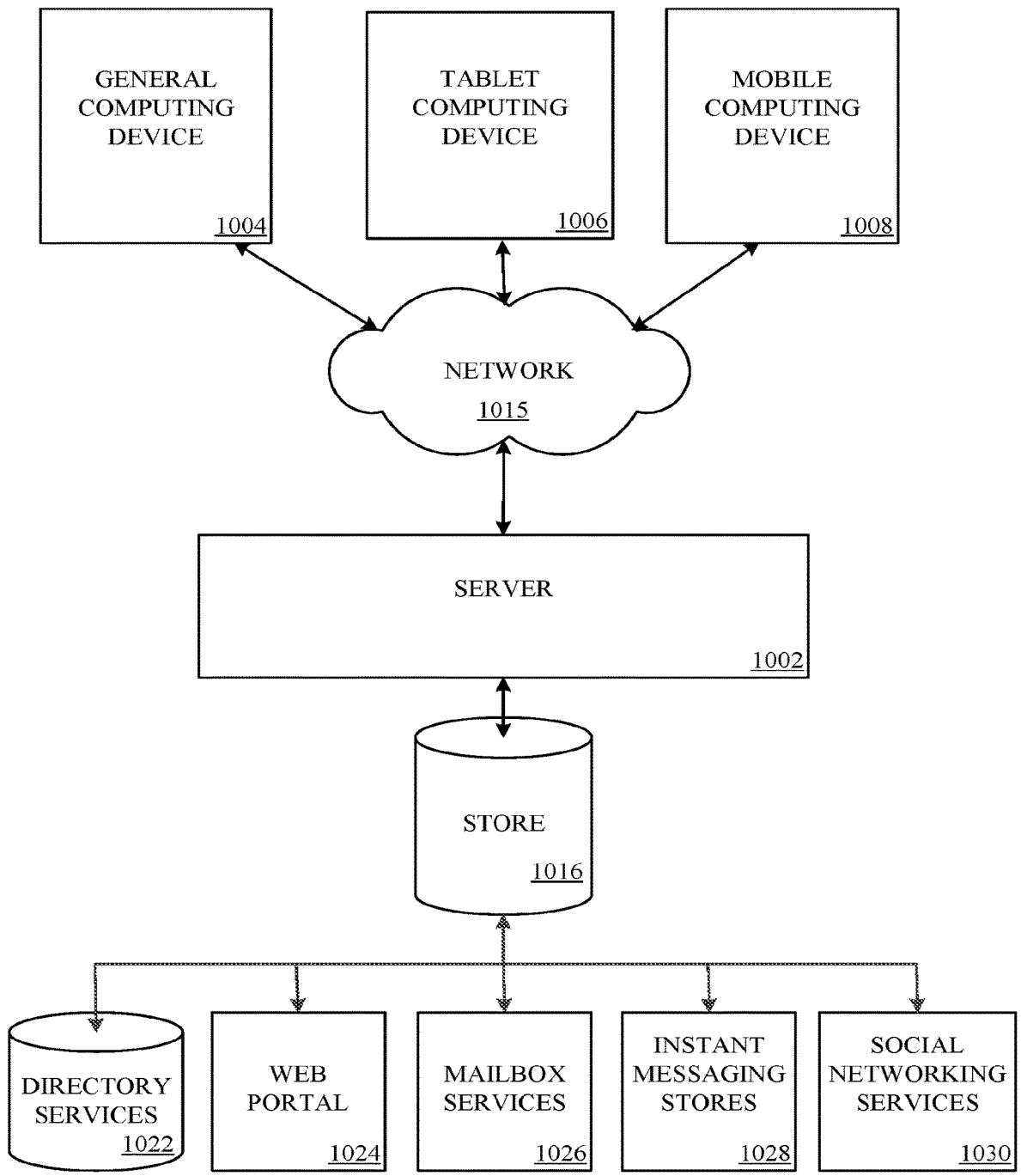
FIG. 10 is a schematic diagram illustrating an example distributed computing environment for providing contextualized short message service data from one or more SMS messages to a client.

FIG. 10 illustrates one example of the architecture of a system for providing personalized feedback from voice other user input analysis as described above. User input may be accessed, interacted with, or edited in association with programming modules 906 and storage/memory which may be stored in different communication channels or other storage types. For example, various documents may be stored using a directory service 1022, a web portal 1024, a mailbox service 1026, an instant messaging store 1028, or a social networking site 1030, application 906, an IO manager, other utilities and storage systems may use any of these types of systems or the like for enabling data utilization, as described herein. A server 1002 may provide a storage system for use by a client operating on a general computing device 1004 and mobile computing devices 1006 through network 1015. By way of example, network 1015 may comprise the Internet or any other type of local or wide area network, and client nodes may be implemented as a computing device embodied in a personal computer, a tablet computing device 1006, and/or by a mobile computing device 1008 (e.g., mobile processing device). Any of these examples of the computing devices described herein may obtain content from the store 1016.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for personalized interaction with a digital assistant, comprising:
receiving a first voice input from a first user;
determining, based on an acoustical analysis of the first voice input, that a user profile exists for the first user, the user profile including user information from previous input of the first user;
obtaining user characteristic information for the first user from the user profile;
categorizing the first voice input into one or more topical categories using the user characteristic information;
identifying one or more keywords from the first voice input using a natural language processing model selected in accordance with the one or more topical categories;
obtaining world knowledge for the first voice input based on the one or more keywords and the user characteristic information;
providing a proactive response to the first user based on the user characteristic information, contextual information corresponding to the first user, the one or more keywords, and the world knowledge obtained for the first voice input;
receiving a second voice input from a second user;
determining based on an acoustical analysis of the second voice input that a user profile does not exist for the second user;
identifying, from the second voice input, a background characteristic of the second user;
categorizing the second voice input into the one or more topical categories using the background characteristic;
identifying one or more keywords from the second voice input, using the natural language processing model selected in accordance with the one or more topical categories, wherein the one or more keywords are the same in the first and second voice inputs;
obtaining world knowledge for the second voice input based on the one or more keywords and the identified background characteristic; and
providing a response to the second user based on the identified background characteristic, the one or more keywords, and the obtained world knowledge for the second voice input, wherein the proactive response provided for the first user is different than the response provided for the second user.

2. The method of claim 1, wherein the contextual information corresponding to the first user comprises at least one of location data, email data, calendar data, contact data, and previous user-inputs that were topically categorized.

3. The method of claim 1, wherein the provided response to the first user includes a reactive response and the proactive response.

4. The method of claim 1, further comprising generating a user profile for the second user and including the identified background characteristic in the generated user profile for the second user.

5. The method of claim 1, wherein categorizing the first voice input from the first user into one or more topical categories further comprises merging an acoustic profile comprising a plurality of machine learned acoustic pattern models for the first user with a machine learned topical profile for the first user.

6. The method of claim 1, wherein the one or more topical categories include: a news category, a travel category, a shopping category, a music category, an event category, a sports category and a dining category.

7. The method of claim 1, further comprising:
analyzing past categorized voice input from the first user;
analyzing world knowledge related to the past categorized voice input from the first user; and
augmenting the response to the first user with the world knowledge related to the past categorized voice input from the first user.

8. The method of claim 1 wherein the user profile for the first user includes one or more acoustic patterns comprising a gender acoustic pattern, an age group acoustic pattern, an accent acoustic pattern, a height acoustic pattern, and an emotional state acoustic pattern.

9. The method of claim 8 further comprising modeling the one or more acoustic patterns for the first user using machine learning.

10. The method of claim 1, further comprising categorizing the first voice input into a tiered hierarchical topical index.

11. A system for personalized interaction with a digital assistant comprising:
a processor; and
memory storing computer executable instructions that, when executed by the processor, cause the system to:
receive a first voice input from a first user;
determine, based on an acoustical analysis of the first voice input, that a user profile exists for the first user, the user profile including user information from previous input of the first user;
obtain user characteristic information for the first user from the user profile;
categorize the first voice input into one or more topical categories using the user characteristic information;
identify one or more keywords from the first voice input using a natural language processing model selected in accordance with the one or more topical categories;
obtain world knowledge for the first voice input based on the one or more keywords and the user characteristic information;
provide a proactive response to the first user based on the user characteristic information, contextual information corresponding to the first user, the one or more keywords, and the world knowledge obtained for the first voice input;
receive a second voice input from a second user;
determine based on an acoustical analysis of the second voice input that a user profile does not exist for the second user;
identify, from the second voice input, a background characteristic of the second user;
categorizing the second voice input into the one or more topical categories using the background characteristic;
identify one or more keywords from the second voice input, using the natural language processing model selected in accordance with the one or more topical categories, wherein the one or more keywords are the same in the first and second voice inputs;
obtain world knowledge for the second voice input based on the one or more keywords and the identified background characteristic; and
provide a response to the second user based on the identified background characteristic, the one or more keywords, and the obtained world knowledge for the second voice input, wherein the proactive response provided for the first user is different than the response provided for the second user.

12. The system of claim 11, wherein the contextual information corresponding to the first user comprises at least one of location data, email data, calendar data, contact data, and previous user-inputs that were topically categorized.

13. The system of claim 11, wherein the provided response to the first user includes a reactive response and the proactive response.

14. The system of claim 11, further comprising computer executable instructions, stored in the memory, that, when executed by the processor, cause the system to:
generate a user profile for the second user and include the identified background characteristic in the generated user profile for the second user.

15. The system of claim 11, further comprising computer executable instructions, stored in memory, that, when executed by the processor, cause the system to categorize the first voice input into a tiered hierarchical topical index.

16. A computer readable storage medium including instructions that, when executed by a processor, cause a set of operations comprising:
receiving a first voice input from a first user;
determining, based on an acoustical analysis of the first voice input, that a user profile exists for the first user, the user profile including user information from previous input of the first user;
obtaining user characteristic information for the first user from the user profile;
categorizing the first voice input into one or more topical categories using the user characteristic information;
identifying one or more keywords from the first voice input using a natural language processing model selected in accordance with the one or more topical categories;
obtaining world knowledge for the first voice input based on the one or more keywords and the user characteristic information;
providing a proactive response to the first user based on the user characteristic information, contextual information corresponding to the first user, the one or more keywords, and the world knowledge obtained for the first voice input;
receiving a second voice input from a second user;
determining based on an acoustical analysis of the second voice input that a user profile does not exist for the second user;
identifying, from the second voice input, a background characteristic of the second user;
categorizing the second voice input into the one or more topical categories using the background characteristic;
identifying one or more keywords from the second voice input, using the natural language processing model selected in accordance with the one or more topical categories, wherein the one or more keywords are the same in the first and second voice inputs;
obtaining world knowledge for the second voice input based on the one or more keywords and the identified background characteristic; and
providing a response to the second user based on the identified background characteristic, the one or more keywords, and the obtained world knowledge for the second voice input, wherein the proactive response provided for the first user is different than the response provided for the second user.

17. The computer readable storage medium of claim 16, wherein the set of operations further comprises:
generating a user profile for the second user and include the identified background characteristic in the generated user profile for the second user.

18. The computer readable storage medium of claim 16, wherein the set of operations further comprises:
categorizing the first voice input into a tiered hierarchical topical index.

19. The computer readable storage medium of claim 16, wherein the set of operations further comprises: merging an acoustic profile comprising a plurality of machine learned acoustic pattern models for the first user with a machine learned topical profile for the first user.

\* \* \* \* \*